(12) United States Patent
Pasquier

(10) Patent No.: US 9,439,342 B2
(45) Date of Patent: Sep. 13, 2016

(54) STRIP TILLING SYSTEM

(71) Applicant: Kverneland Group Les Landes Genusson, Les Landes Genusson (FR)

(72) Inventor: Gaetan Pasquier, Saint Philbert du Pont Charrault (FR)

(73) Assignee: Kverneland Group Les Landes Genusson, Les Landes Genusson (FR)

( * ) Notice: Subject to any disclaimer, the term of this patent is extended or adjusted under 35 U.S.C. 154(b) by 0 days.

(21) Appl. No.: 14/766,383

(22) PCT Filed: Feb. 10, 2014

(86) PCT No.: PCT/EP2014/052555
§ 371 (c)(1),
(2) Date: Aug. 6, 2015

(87) PCT Pub. No.: WO2014/122309
PCT Pub. Date: Aug. 14, 2014

(65) Prior Publication Data
US 2015/0373902 A1    Dec. 31, 2015

(30) Foreign Application Priority Data

Feb. 11, 2013    (GB) .................................. 1302396.5

(51) Int. Cl.
| G06F 7/70 | (2006.01) |
|---|---|
| A01C 5/06 | (2006.01) |
| A01B 79/00 | (2006.01) |
| A01C 7/20 | (2006.01) |
| A01C 21/00 | (2006.01) |
| A01B 49/06 | (2006.01) |

(52) U.S. Cl.
CPC ............... *A01C 5/062* (2013.01); *A01B 49/06* (2013.01); *A01B 79/00* (2013.01); *A01B 79/005* (2013.01); *A01C 7/203* (2013.01); *A01C 21/00* (2013.01)

(58) Field of Classification Search
USPC ............................................................ 701/50
See application file for complete search history.

(56) References Cited

U.S. PATENT DOCUMENTS

| 4,686,914 A | 8/1987 | Schaaf et al. |
|---|---|---|
| 5,331,907 A | 7/1994 | Beaujot |

(Continued)

FOREIGN PATENT DOCUMENTS

| CA | 2528468 A1 | 5/2010 |
|---|---|---|
| CN | 2565243 Y | 8/2003 |

(Continued)

OTHER PUBLICATIONS

International Search Report and Written Opinion from corresponding International Application No. PCT/EP2014/052555, mailed Jul. 22, 2014, in 10 pages.

(Continued)

*Primary Examiner* — Hussein A. Elchanti
(74) *Attorney, Agent, or Firm* — Knobbe, Martens, Olson & Bear, LLP

(57) ABSTRACT

Various strip tilling systems and methods are disclosed. In some embodiments, the strip tilling system includes: at least one strip tilling unit, said strip tilling unit including a support frame, at least one tilling member mounted to the support frame; at least one fertilizer delivery device mounted to the support frame; and a control system arranged to adjust the position of the fertilizer delivery device with respect to the support frame.

42 Claims, 9 Drawing Sheets

(56) References Cited

U.S. PATENT DOCUMENTS

| | | | | |
|---|---|---|---|---|
| 6,085,135 | A * | 7/2000 | Steckel | A01B 79/005 340/988 |
| 6,142,085 | A | 11/2000 | Drever et al. | |
| 6,178,900 | B1 | 1/2001 | Dietrich, Sr. | |
| 6,336,066 | B1 * | 1/2002 | Pellenc | A01B 79/005 172/2 |
| 8,639,416 | B2 * | 1/2014 | Jones | A01B 69/007 342/357.22 |
| 8,649,930 | B2 * | 2/2014 | Reeve | A01B 69/008 701/23 |
| 8,897,973 | B2 * | 11/2014 | Hunt | G06Q 10/00 701/1 |
| 9,002,566 | B2 * | 4/2015 | McClure | G05D 1/0246 701/23 |
| 9,026,316 | B2 * | 5/2015 | Holland | A01C 21/007 701/50 |
| 9,058,560 | B2 * | 6/2015 | Johnson | G06F 17/30463 |
| 9,113,590 | B2 * | 8/2015 | Johnson | A01B 79/005 |
| 2010/0270043 | A1 | 10/2010 | Ankenman | |
| 2015/0378362 | A1 | 12/2015 | Hulin | |

FOREIGN PATENT DOCUMENTS

| | | |
|---|---|---|
| CN | 201018763 Y | 2/2008 |
| CN | 201905011 U | 7/2011 |
| CN | 201911010 U | 7/2011 |
| WO | WO 2014/122309 A1 | 8/2014 |

OTHER PUBLICATIONS

Combined Search and Examination Report from corresponding United Kingdom Application No. 1302396.5, dated Jun. 14, 2013, in 6 pages.

* cited by examiner

STRIP TILLING SYSTEM

CROSS REFERENCE

This application is a U.S. National Phase of PCT International Application No. PCT/EP2014/052555, filed Feb. 10, 2014 and published as WO 2014/122309 on Aug. 14, 2014, which claims priority to United Kingdom Application No. GB1302396.5, filed Feb. 11, 2013. The entire disclosure of each of the above-identified applications is hereby incorporated by reference.

BACKGROUND

The present disclosure relates to a strip tilling system and a method for strip tilling.

It is necessary for farmers to till their land in preparation to plant seeds. In recent years, it has become popular for farmers to strip till the land rather than tilling the entire field. Strip tilling is a conservation system that uses a minimum amount of tillage, whereby a farmer only tills strips of land, thereby only disturbing those parts of the field that are to receive seeds. The strips are typically around 5 to 25 cm wide, are spaced apart and are arranged substantially parallel to one another.

SUMMARY

In order to strip till a field, a farmer uses a tractor unit to pull strip tilling apparatus across the field. The strip tilling apparatus typically includes an assembly having a plurality of strip tilling gangs attached to a transverse beam, with each gang being spaced apart along the beam. Each gang includes a tine and/or other soil treatment apparatus such as cutting wheels. The strip tilling gangs could alternatively be attached to any other alternative construction like a "V"-frame, an arrangement of transverse beams for example in a parallel arrangement.

In some strip tilling operations, it is desirable to include fertilizer delivery apparatus, such as a plurality of fertilizer delivery tubes for delivering the fertilizer to the seeds. In certain apparatuses, each delivery tube is fixed to its respective tine or an adjacent support frame so that fertilizer can be consistently delivered to the seeds at a consistent rate. However, it has been found by the inventors that different tilling conditions may warrant different fertilizer delivery settings, for example to increase or decrease the fertilizer dispersion. This is particularly true where the soil is highly compacted.

Some strip tilling systems allow the positions of the fertilizer delivery tubes to be adjusted manually. However this is unsatisfactory since the farmer has to stop the tractor unit in order to adjust the setting, which slows down the tilling operation. Furthermore, known systems often lack flexibility to select appropriate positions for each delivery tube. The inventors have found that this problem is exacerbated when the position of the tine is adjustable with respect to a support frame, since the localised tilling conditions are variable.

The effectiveness of the strip tilling apparatus is in part determined by the soil conditions. With large field sizes, the soil conditions can be different in different parts of the field, for example some parts of the field may have clay soils 1 whereas other parts of the field may have a different type of soil such as sandy soil 2 (this is illustrated in FIG. 1). Furthermore, the topography of the field can be such that there are other features that the farmer has to negotiate such as old edges 3, underground pipe work 4 (e.g. drains), rocky outcrops 5, and localised depressions and/or raised areas 6. All of these features pose challenges for traditional strip tilling apparatus.

A further problem for farmers is that tire tracks are often formed in the soil by heavy agricultural vehicles such as tractor units, sprayers, combine harvesters, etc. The tires compact the soil along the tire tracks making it more difficult to till the soil along the tire tracks in future tilling operations. This is illustrated in FIGS. 2 and 3. The problem is exacerbated when the soil is wet. Furthermore, some soil types are affected more than others.

FIG. 2 shows an exemplary result of a strip tilling operation that took place in year 1. Tilled strips 7 are formed in the ground by tines on either side of a tire track 9. Each strip 7 includes a raised portion of height A, which is typically around 5 cm above the nominal ground level, and a tilled depth B, which is typically around 3-40 cm from the nominal ground level. The strips 7 are spaced apart by a distance C, which is typically around 30-100 cm. The tire track 9 is formed by a tractor unit, which pulls the strip tilling apparatus there behind, and comprises a longitudinal depression in the soil.

FIG. 3 illustrates the difficulty in strip tilling along the tire track 9 in Year 2. It can be seen from the cross-section that the soil at the surface, and below the tire track 9, is compacted 8, which makes tilling more difficult. Also, because of the compaction below the track 9, it can be seen that tilling to the depth B of the adjacent strips 7 does not adequately break through the compacted soil. Therefore the seeds planted along tilled tire tracks 9 are unlikely to grow as well as the seeds planted in the adjacent tilled strips 7, which can lead to a reduced harvest in Year 2.

The problem of track compaction also arises during a tilling operation when a tractor tire is substantially aligned with a tilling member, and thus the track formed by the tire is aligned or in very close border of the tilling member which is following it. This problem occurs most often when the tractor has wide wheels, and/or when there is narrow inter-row distance.

Accordingly the present disclosure seeks to provide a strip tilling system and method that mitigates at least one of the aforementioned problems, or at least provides an alternative to existing apparatus and methods.

In some embodiments, the strip tilling system enables the control system to adjust the position of the fertilizer delivery device during a tilling operation. This provides more optimised delivery of the fertilizer during a tilling operation or any other foregoing operation on the field.

Advantageously the control system can be arranged to control the position of the fertilizer delivery device independently the tilling member.

Advantageously the fertilizer delivery device can be constrained to move along one axis.

Advantageously the fertilizer delivery device can be arranged to move in a substantially vertical direction. Alternatively the fertilizer delivery device can be mounted so that it is inclined with respect to the support frame, and is arranged to move along an inclined axis.

Advantageously the fertilizer delivery device can be slidably mounted.

Advantageously the fertilizer delivery device is mounted to the at least one mounting member and is arranged to move relative to the mounting member. Advantageously the fertilizer delivery device can be slidably mounted to the mounting member.

The mounting member is attached to the support frame. Advantageously the mounting member can be pivotally attached to the support frame. The tilling system can include damping means for damping pivoting movement of the mounting member with respect to the support frame.

Advantageously the fertilizer delivery device is attached to a support element. The support element is slidably mounted to the mounting member. For example, the support element can be mounted in at least one slot and the support is arranged for sliding movement within the, or each, slot. Advantageously the, or each, slot can be formed in the mounting member. In a preferred embodiment, the mounting member includes at least one mounting block fixed to at least one mounting element. The support element is mounted in a slot formed in the, or each, mounting block.

Limiting means can be provided for limiting the movement of the support element. For example, at least one of the support element and the mounting member can include at least one stop member to limit relative movement between the support element, and hence the fertilizer delivery device, and the mounting member.

Advantageously the control system can include a first actuator for moving the fertilizer delivery device. For embodiments including a plurality of fertilizer delivery devices, each fertilizer delivery device includes its own first actuator.

Advantageously the strip tilling system can include means for locking the position of the, or each, fertilizer delivery device. This prevents the first actuator(s) from having to hold the position of each of the fertilizer delivery devices.

Advantageously the control system can be arranged to adjust the position of the tilling member with respect to the support frame. This enables the control system to adjust the position of the tilling member during a tilling operation, thereby enabling the control system to adjust the tilling depth of the, or each, tilling member.

Advantageously the strip tilling system can include a positioning system; and memory means including map data relating to a field to be tilled, said map data including data identifying areas of compacted ground in the field; wherein said control system is arranged to automatically adjust the position of at least one of the tilling member and the fertilizer delivery device with respect to the support frame when the control system determines from signals received from the positioning system, and from the map data, that at least one of the tilling member and the fertilizer delivery device is located at an area of compacted ground. This enables a tilling member tilling depth to be adjusted when the tilling member is in an area of compacted soil during operation of the strip tilling system. Typically the tilling member tilling depth is increased in areas of compacted soil. The fertilizer delivery device can be adjusted as necessary.

Advantageously at least some of the areas of compacted soil in the map data relate to positions of vehicle tire tracks, and the control system is arranged to adjust the position of the tilling member to increase the tilling depth when it determines that the tine is tilling along (or across) a tire track. The map data can be stored in memory means, preferably in the form of a map database.

Advantageously the positioning system can include tracking means for recording locations of new vehicle tire tracks formed in the ground. This is particularly useful for recording positions of new tire tracks during a tilling operation.

Advantageously the positioning system can be arranged to add the locations of the new vehicle tire tracks to the map data. The map data can be updated after each visit to the mapped area, for example each time a tilling operation is performed. Thus, the control system is able to take into account each new tire track when setting the deployment position for the tilling member.

Advantageously the map data can include data relating to at least one of the following: underground obstacles; ground level obstacles; localised depressions; localised raised areas; details of former work programs used on the field, which may include data relating to the location and arrangement of tilled strips, ploughing, conservation tillage areas, and no-tillage areas; soil compaction by animals; soil compaction by other means, such as other vehicles; other work programs for the land, including drilling programs; and soil type(s). The control system can be arranged to adjust the deployment position of at least one of the fertilizer delivery devices and the tilling member(s) according to at least one of the aforementioned data types, and position data received from the positioning system. For example, the control system can be arranged to adjust the position of at least one of the tilling member and the fertilizer delivery device when the control system determines from signals received from the positioning system, and from the map data, that at least one of the tilling member and the fertilizer delivery device is located at a position of a previously tilled and/or drilled area of ground. This feature is particularly useful in fields which are not square or rectangle and moreover when a drilling device is coupled with the tilling apparatus.

The control system can be arranged to adjust the position of at least one of the tilling member and the fertilizer delivery device when it determines that at least one of the tilling member and the fertilizer delivery device is arranged such that it is substantially in line with a tractor wheel. Thus the control system actuates the tilling member and/or the fertilizer delivery device to take account of the tire track formed by the tractor pulling the tilling apparatus. For example, during a set-up operation the farmer can program the control system to indicate which of the tilling members is substantially in line with the tractor wheels and the control system can adjust those (or that) tilling member(s) accordingly, for example by increasing the tilling depth.

The tilling member is preferably constrained to move along one axis. This provides a simple deployment arrangement.

Advantageously the tilling member can be arranged to move in a substantially vertical direction. Alternatively the tilling member can be mounted so that it is inclined with respect to the support frame, and is arranged to move along an inclined axis.

Advantageously the tilling member is mounted to the mounting member and is arranged to move relative to the mounting member. Advantageously the tilling member is slidably mounted to the mounting member.

The tilling member can be mounted in at least one slot and is arranged for sliding movement within the, or each, slot. Advantageously the, or each, slot can be formed in the mounting member. In a preferred embodiment, the mounting member comprises at least one mounting block fixed to at least one mounting element. The tilling member is mounted in a slot formed in the, or each, mounting block. This provides an arrangement that is easy to assemble and that is robust.

The system can include limiting means for limiting the movement of the tilling member. At least one of the tilling member and the mounting member can include at least one stop member. For example, the tilling member can include at least one formation that is arranged to engage with the mounting member in order to limit its movement relative to the mounting member.

The support frame can include first and second support members and at least one of the tilling member, fertilizer delivery device and the mounting member is located between the first and second support members. The first and second support members are preferably arranged substantially parallel with one another.

Advantageously the control system can include a second actuator for adjusting the position of the tilling member with respect to the support frame. At least one of the first and second actuators is preferably a hydraulic actuator, however other types of actuator, such as an electro-mechanical actuator can be used.

Advantageously the system can include a plurality of fertilizer delivery devices. Each fertilizer delivery device can be arranged according to any configuration described above. Typically each fertilizer delivery device is similarly arranged. Advantageously the control system can be arranged to adjust the position of at least one, and preferably at least some, of the fertilizer delivery devices independently of the other fertilizer delivery devices.

Advantageously the control system can be arranged to adjust the position of each fertilizer delivery device independently of the other fertilizer delivery devices.

Advantageously the control system is arranged to adjust the position of the fertilizer delivery device independently of its respective tilling member.

The control system can be arranged to deploy each of the fertilizer delivery devices to substantially equivalent deployment positions. This is irrespective of the deployment position of respective tilling member. That is, the control system may deploy each of the tilling members to different tilling depths, however each of the fertilizer delivery devices are deployed at substantially the same deployment depth. This helps to provide a more consistent delivery of fertilizer.

Typically the number of fertilizer delivery devices equals the number of tilling members.

In preferred embodiments the tilling system includes a plurality of tilling members. Each tilling member can be arranged to according to any configuration described herein.

Typically each tilling member is similarly arranged. For embodiments including a plurality of tilling members, each tilling member has its own second actuator.

Advantageously the control system can be arranged to adjust the position of at least one, and preferably at least some, tilling member independently of the other tilling members. This ensures that an appropriate tilling depth can be set for each tilling member, for example taking into account the conditions in the specific location being tilled by that tilling member. Preferably the control system is arranged to adjust the position of each of the tilling members independently of the other tilling members.

Advantageously the strip tilling system can include means for locking the position of the, or each, tilling member. This helps to reduce the load on the second actuator.

The tilling system can be arranged in tilling units. For example, the tilling system can include a plurality of strip tilling units. Each strip tilling unit includes: a support frame; a tilling member mounted to the support fame; and a fertilizer delivery device according to the support frame. Optionally each tilling unit can include at least one additional soil conditioning device such as a cutting disc. Advantageously the strip tilling system can include a transverse beam that is arranged to be connected to a tractor unit. Each tilling unit can include attachment means and can be attached to the transverse beam, preferably in a releasably attachable manner. Each tilling unit can be arranged substantially perpendicular to the transverse beam. Each tilling unit is spaced apart, typically uniformly spaced.

According to some embodiments, there is provided a strip tilling system, including: at least one tilling member mounted to a support frame; and a control system for adjusting the position of the tilling member with respect to the support frame.

BRIEF DESCRIPTION OF THE DRAWINGS

An embodiment of the strip tilling system (also called a strip tilling apparatus or a tilling apparatus) will now be described, by way of example only, with reference to the accompanying drawings in which.

DETAILED DESCRIPTION OF CERTAIN EMBODIMENTS

Figure 1:
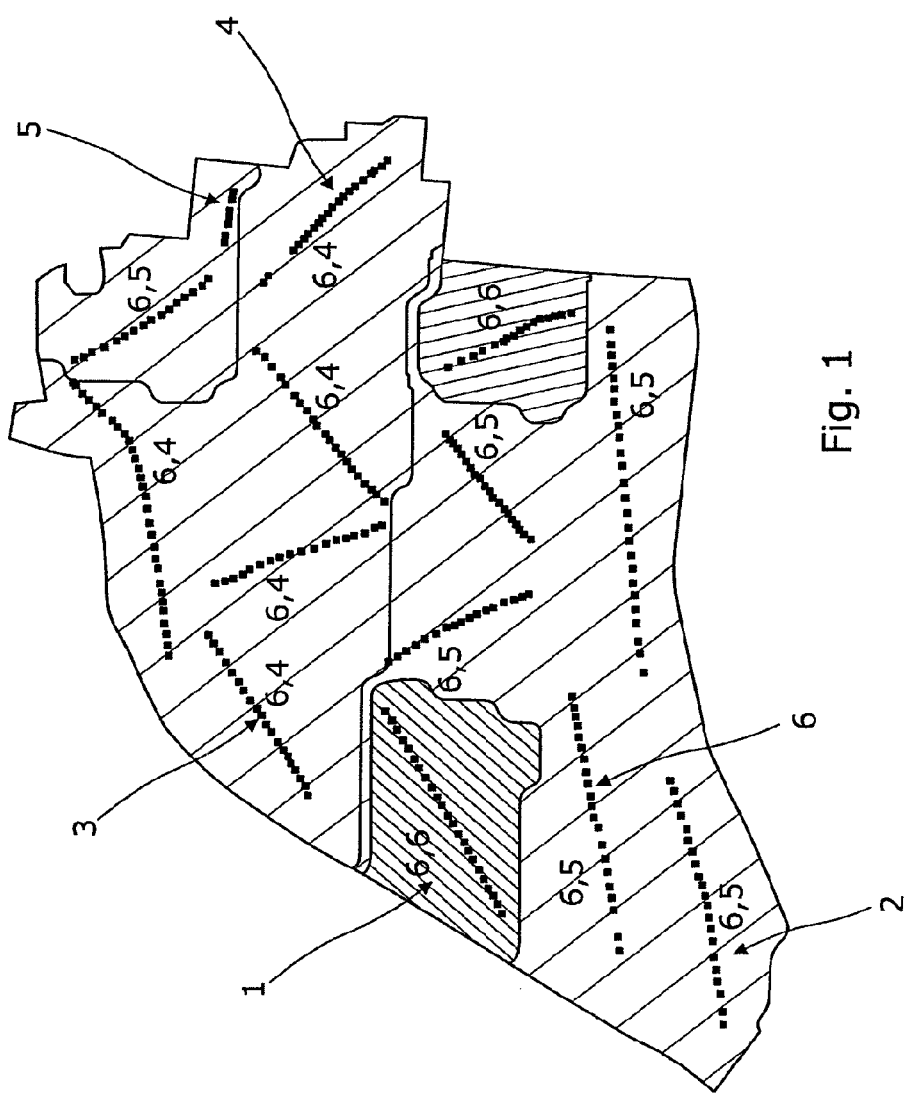
FIG. 1 is a diagrammatic map of a field, showing different soil types.
Figure 2:
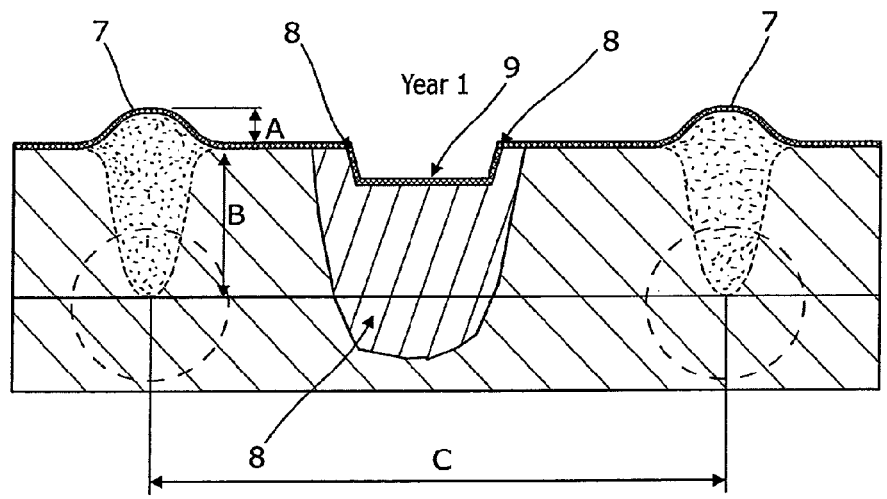
FIGS. 2 and 3 are diagrammatic views of a strip tilled field in Years 1 and 2 respectively, which illustrate one of the problems with conventional strip-tilling apparatus.

FIGS. 4 to 8 show a strip tilling apparatus 11. The apparatus 11 includes: at least one tilling unit (commonly referred to as a "gang") 13, with each gang 13 including an adjustable tine 15; and a control system 17 for adjusting the position of each tine 15 relative to its respective gang 13.

The arrangement of one gang 13, will now be described, in more detail, however the description is applicable to each of the gangs 13 (six shown).

Figure 5:
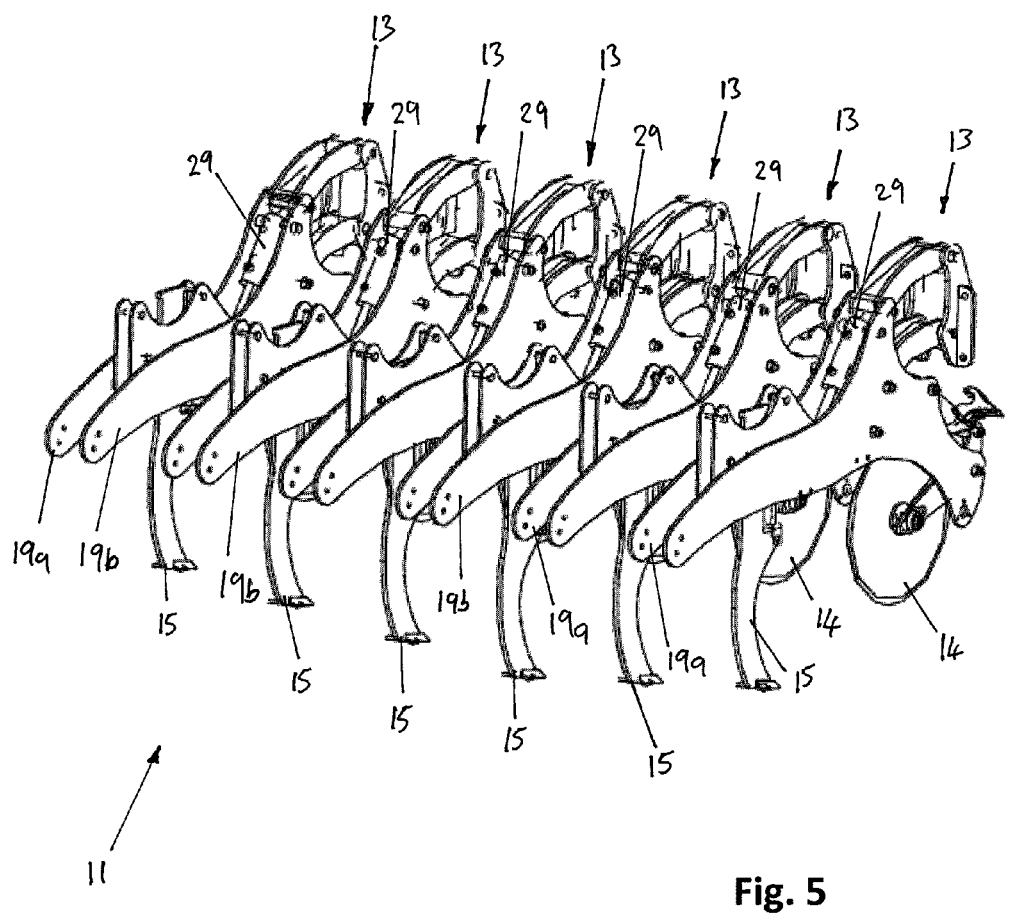
FIG. 5 is an isometric view of a strip-tilling apparatus in accordance with the strip tilling system, including six strip-tilling (connecting beam and fertilizer delivery tubes omitted for clarity)
Figure 7:
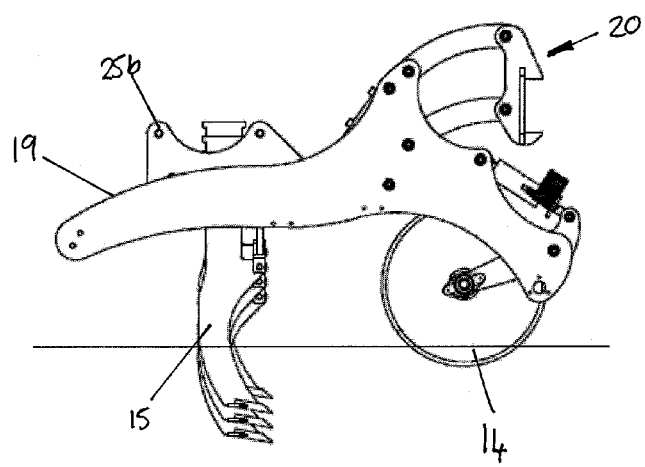
FIG. 7 is a side view of the strip-tilling apparatus of FIG. 5.
Figure 8:
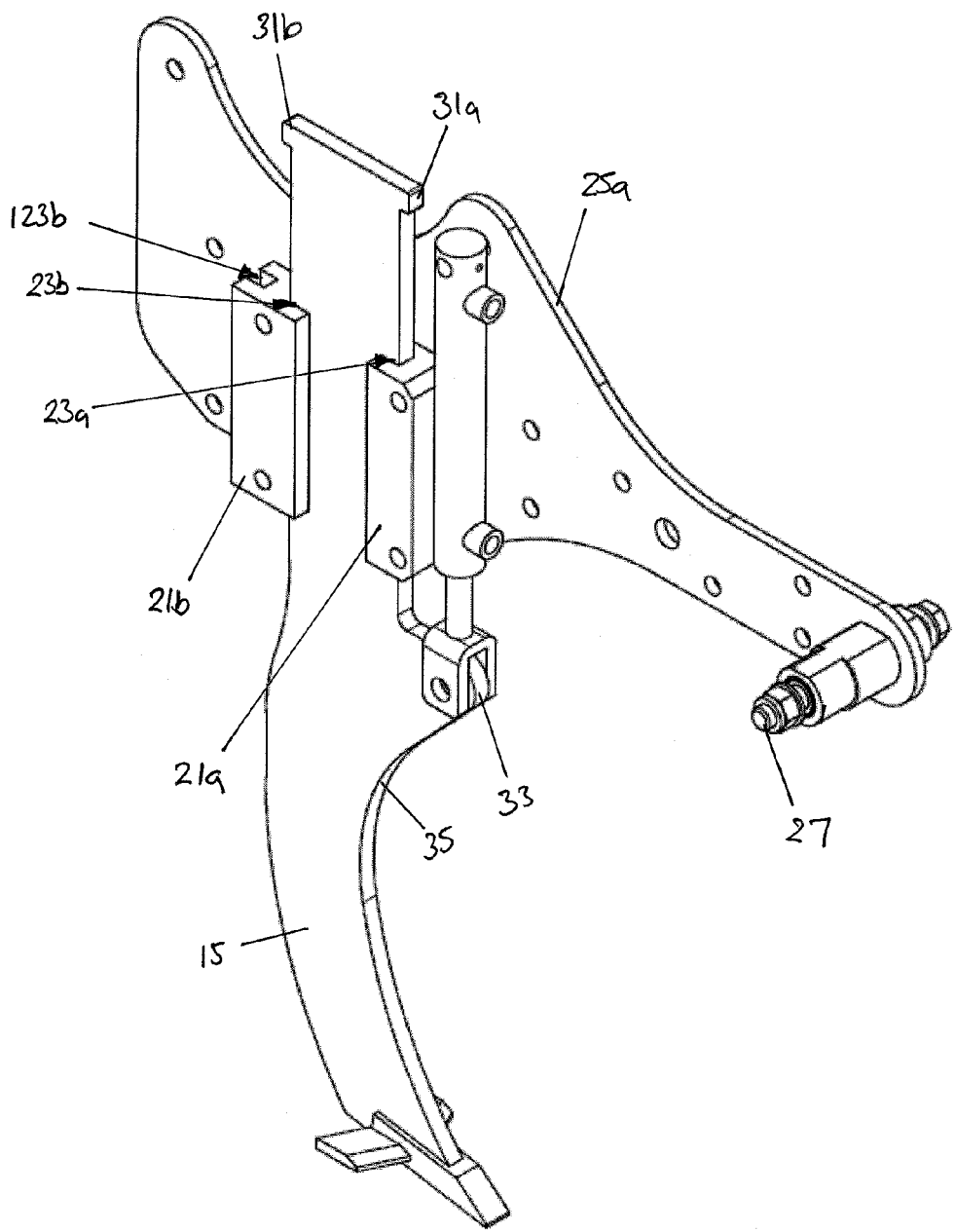
FIG. 8 is an enlarged isometric view of part of a strip-tilling assembly, showing an adjustable tine.

The gang 13 includes a support frame 19 (see FIGS. 5 and 7). The support frame 19 includes first and second support members 19a,19b. The first and second support members 19a,19b are arranged substantially parallel to one another and are spaced apart. The tine 15 is mounted to the support frame 19 between the first and second support members 19a,19b in a manner that enables the control system 17 to adjust the position of the tine 15 with respect to the support frame 19. Each gang 13 includes a connector 20 for connecting the gang 13 to a transverse beam that is pulled by a tractor unit.

A cutting wheel 14 is mounted substantially in line with the tine 15, in a position that is forward of the tine 15, when the apparatus 11 is moving in its normal operating direction.

The tine 15 is mounted to a mounting member, which comprises first and second mounting blocks 21a,21b and first and second mounting elements 25a,25b. The tine 15 is mounted in the first and second mounting blocks 21a,21b. The mounting blocks 21a,21b each include a tine receiving slot 23a,23b formed therein. The tine 15 is mounted in the slots 23a,23b and is arranged for sliding movement along the slots 23a,23b relative to the mounting blocks 21a,21b. Thus the tine 15 is able to adjust its position along an axis. The mounting blocks 21a,21b are bolted to the first and second mounting elements 25a,25b. The arrangement is such that the tine 15 is located between the first and second mounting elements 25a,25b. The first and second mounting elements 25a,25b are pivotally attached to the first and second support members 19a,19b via a pivot pin 27. The arrangement is such that the first and second mounting elements 25a,25b are located between the first and second support members 19a,19b. The first and second mounting elements 25a,25b are arranged substantially parallel to the first and second support members 19a,19b.

The pivot pin 27 is located towards a front end of each mounting element 25a,25b. The pivot pin 27 is arranged substantially orthogonal to each of the mounting elements 25a,25b. The pivot pin 27 is arranged substantially orthogonal to each of the support members 19a,19b.

The mounting elements 25a,25b are further connected to the support frames 19a,19b via a hydraulic cylinder 29. The hydraulic cylinder 29 is arranged to retain the orientation of the mounting elements 25a,25b substantially constant with respect to the support members 19a,19b, while allowing some limited damped movement relative thereto. Thus the hydraulic cylinder 29 acts as a shock absorber. The hydraulic cylinder 29 is pivotally attached to the mounting elements 25a,25b and the support frames 19a,19b.

The mounting blocks 21a,21b, mounting elements 25a, 25b and the support members 19a,19b are arranged such that the tine 15 is arranged to move along an axis that is in a substantially vertical plane. However, it will be appreciated by the skilled person that mounting arrangement can be such that the tine 15 is oriented inclined to the vertical plane, and can be arranged to move along an axis that is inclined to the vertical plane.

The tine 15 includes limiting protrusions 31a,31b that are arranged to engage with the first and second mounting blocks 21a,21b respectively to limit the axial movement of the tine 15 within the slot. The first and second protrusions 31a,31b are located towards one end of the tine 15, and provide it with a substantially T-shaped configuration. The tine 15 includes a drive formation 33. The drive formation 33 comprises a protrusion in a leading side 35 of the tine, in a mid-portion thereof. The drive formation 33 provides an anchor point to enable a hydraulic actuator 37 to be pivotally attached thereto. The hydraulic actuator 37 is arranged to adjust the position of the tine 15 relative to the mounting blocks 21a,23. Typically the tine 15 is moveable over a distance of around 30 cm from a fully retracted position to a fully deployed position. The movement can be arranged so that the position is continuously adjustable, or alternatively the tine 15 can be arranged to move between predetermined discrete positions, e.g. high, medium and low positions.

The hydraulic actuator 37 is controlled by the control system 17, which includes a suitable controller such as a microprocessor. The control system 17 obtains signals from a positioning system 39, such as a Global Positioning System (GPS) (see FIG. 4). The control system 17 is arranged to control the position of the tine 15 in accordance with signals received from the positioning system 39.

The positioning system 39 includes a map database 41, which is stored in a suitable memory device, for example a non-volatile computer storage medium such as flash memory, and which includes detailed maps of the fields where the tilling apparatus 11 is to be used. The map database 41 can include details of at least some of the following: the soil types for each part of the field, the locations of tire tracks, areas of compacted soil caused by other factors, underground features such as drains and cables, ground level obstacles, localised depressions and/or raised areas, and old boundaries.

Figure 6:
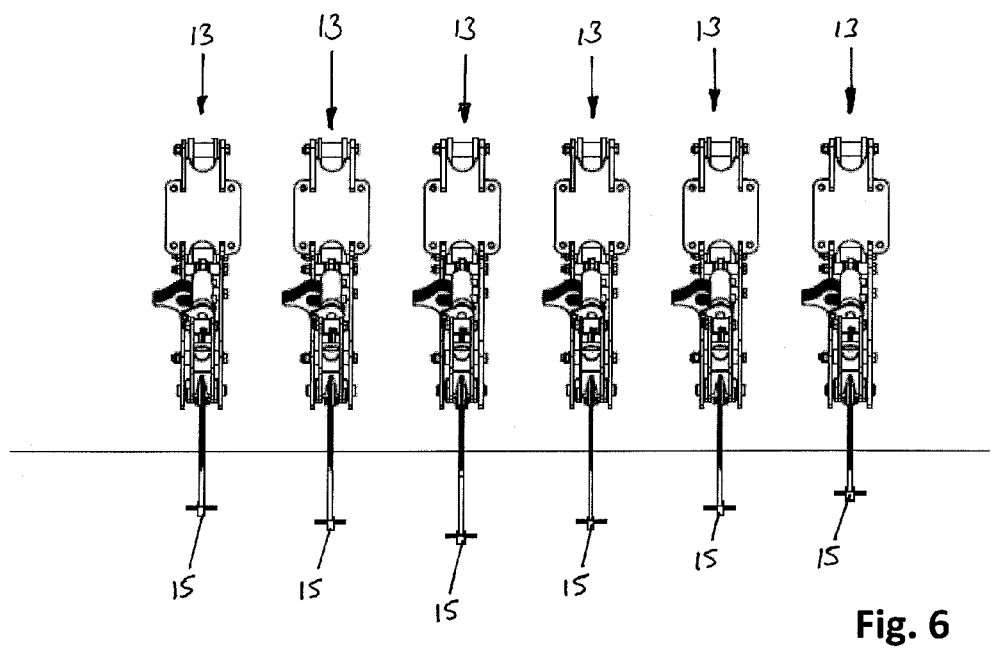
FIG. 6 is a front view of the strip-tilling apparatus of FIG. 5.

The positioning system 39 is arranged to detect the position of the tilling apparatus in the field to a high degree of accuracy, typically to within 5 cm, and to provide information from the map database 41 that is relevant to the detected position, such as the soil type, level of compaction, notify the control system if any of the tines 15 apparatus are moving along a tire track 9, notification of any underground and/or above-above-ground obstacles, etc. The control system 17 automatically adjusts the position of each tine 15 in accordance with the signals received from the positioning system 39 to select the most appropriate tine deployment position for that location. Thus a system including several gangs 13, has each tine 15 individually deployed to an appropriate position for the local conditions for that tine 15. The adjustment process takes place dynamically and therefore the position of each tine 15 is adjusted as the tilling apparatus 11 moves through the field. FIGS. 6 and 7 show an arrangement of the strip tilling apparatus 11 having six tilling gangs 13, and therefore six tines 15. It can be seen that each tine 15 is deployed to the appropriate depth for tilling the ground in its specific location.

Figure 3:
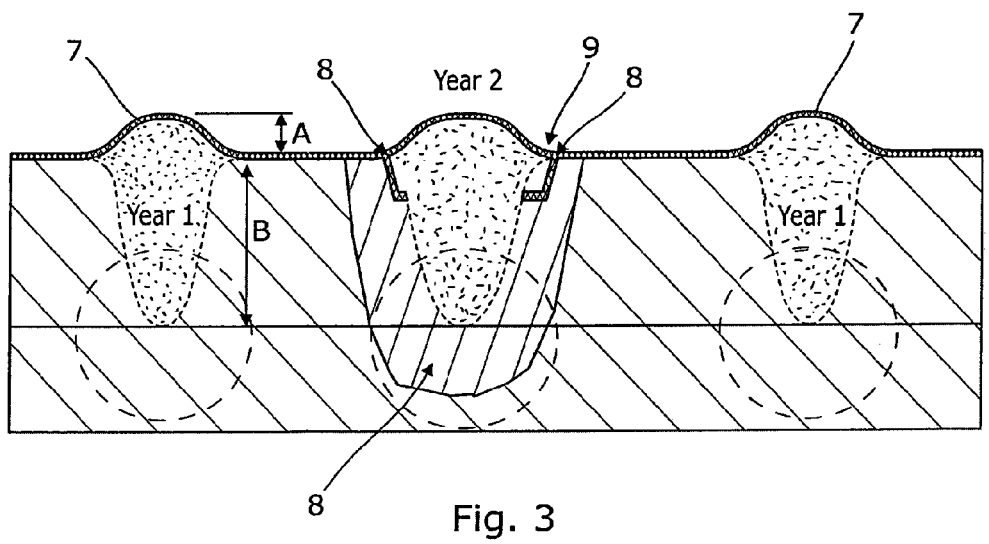
Figure 4:
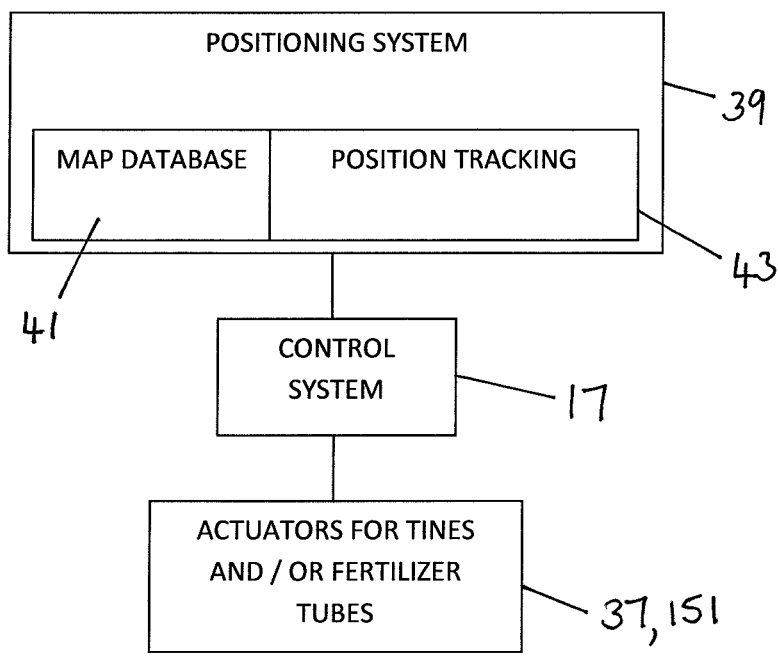
FIG. 4 is a diagrammatic view of a control system of the strip tilling system.
Figure 9:
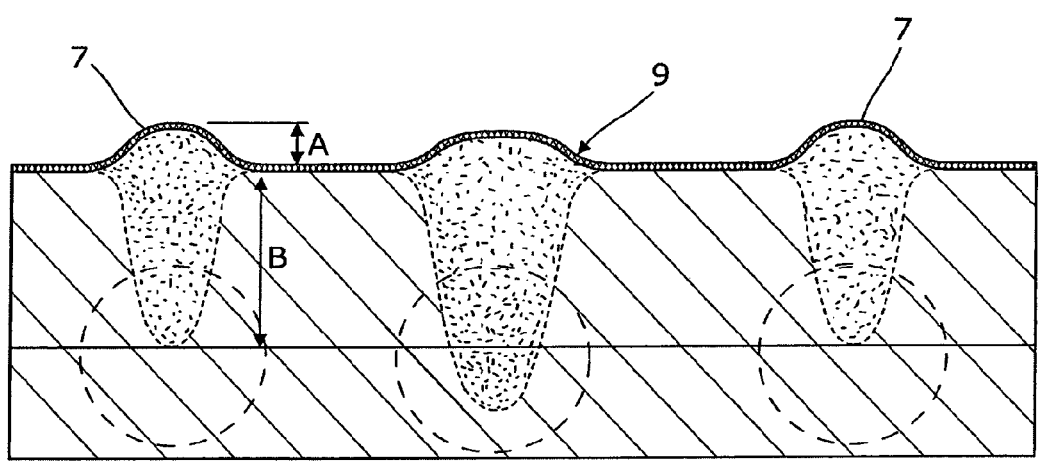
FIG. 9 is a diagrammatic view of a strip tilled field in Year 2 after use of the strip tilling system, for comparison purposes with FIG. 2.

The strip tilling system has particular utility for detecting that the tilling apparatus 11 is tilling along at least one tire track 9, i.e. where the ground is highly compacted. From this, the control system 17 is able to deploy the tine 15 tilling along the track 9 to an increased tilling depth B to more effectively disturb the compacted soil. FIG. 9 illustrates the result of using strip tilling system to till along the tire track 9. It can be seen that the tilling depth along the tire track 9 is greater than the adjacent strips 7. Comparing FIG. 9 to FIG. 3 shows that the increased tilling depth B enables the tine to break through the compacted soil.

The positioning system 39 also includes a position tracking function 43 to enable the positioning system 39 to record the route taken by a tractor unit (or any other agricultural vehicle) so that the positions of the tire tracks 9 in the field can be accurately recorded over time. Each new set of tire tracks 9 is added to the map database 41 stored in the memory device. Each vehicle that works the field can include a positioning system to ensure that all tire track data is recorded and added to the map database 41, i.e. not just the vehicle that is used to pull the tilling apparatus 11.

Figure 10:
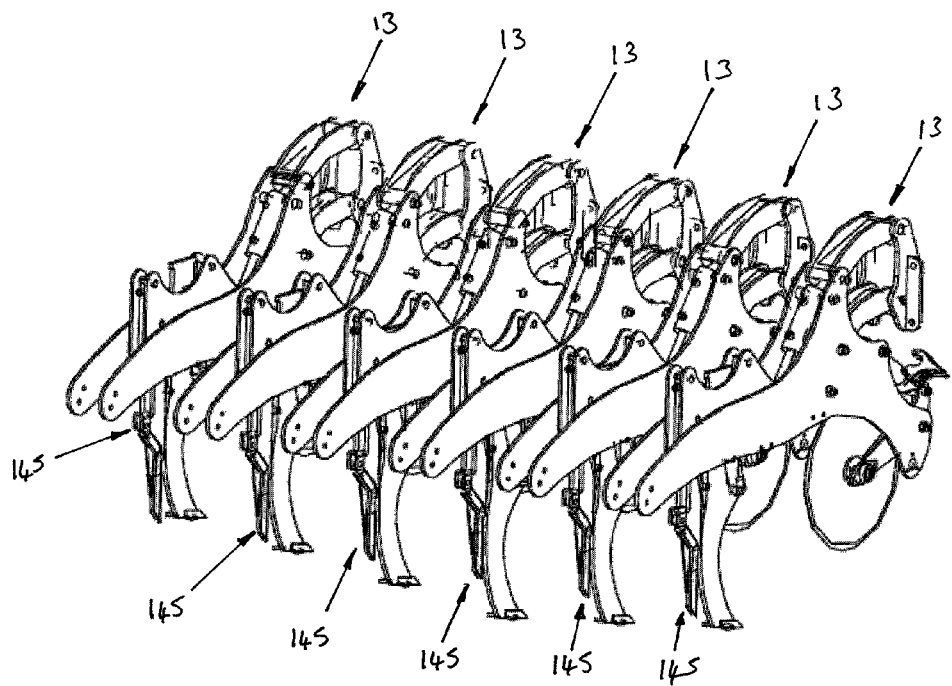
FIG. 10 is an isometric view of the strip-tilling apparatus of FIG. 5 including an adjustable fertilizer tube on each of the strip tilling assemblies.
Figure 11:
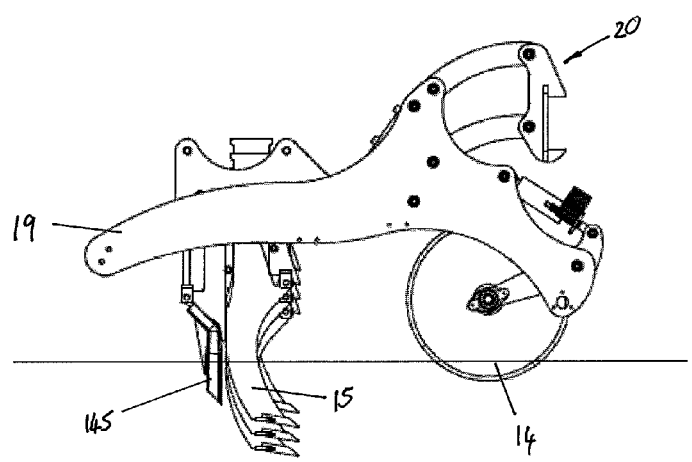
FIG. 11 is a side view of the strip-tilling apparatus of FIG. 10.
Figure 12:
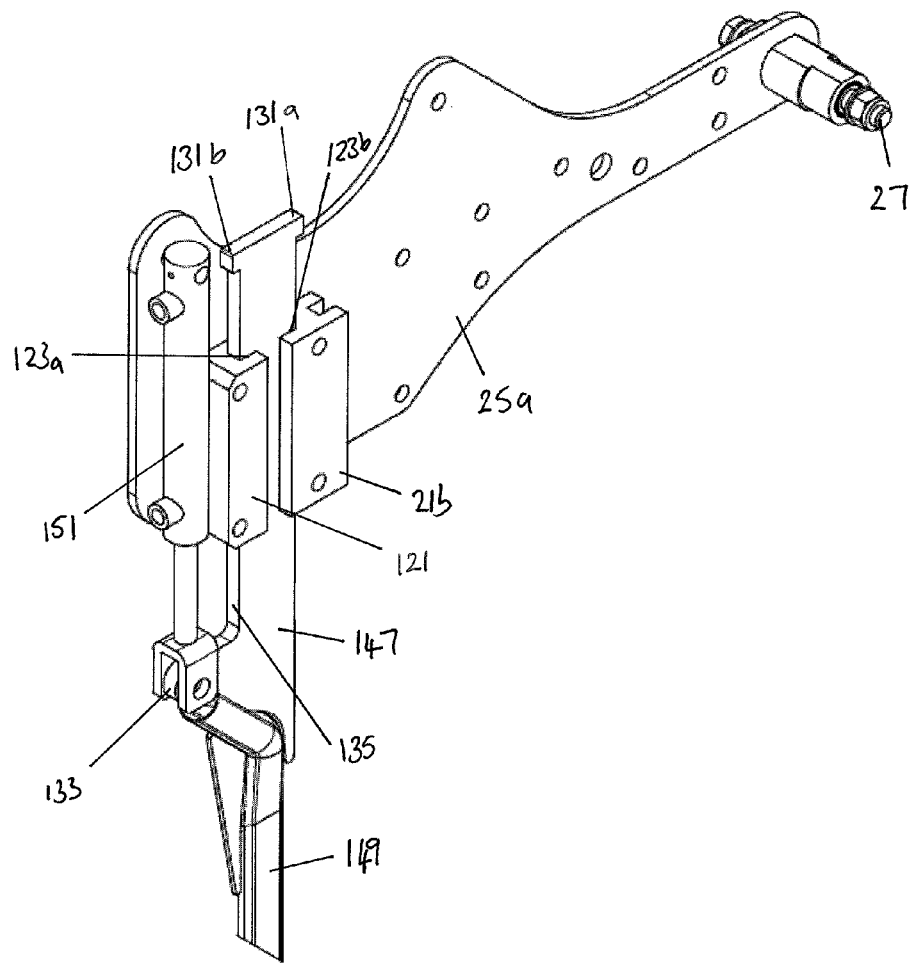
FIG. 12 is an enlarged isometric view of part of a strip-tilling assembly, showing an adjustable fertilizer tube.

Each tilling unit 13 further includes an adjustable fertilizer delivery assembly 145 (see FIGS. 10 to 12).

The fertilizer delivery assembly 145 in each gang 13 includes a support element 147, a delivery tube (sometimes referred to as an applicator) 149 and a hydraulic actuator 151. The delivery tube 149 is attached to the support element 147 and is arranged to move therewith. The support element 147 is mounted in the second mounting block 21b and a third mounting block 121. The second and third mounting blocks 21b,121 each include a support element receiving slot 123a, 123b formed therein. The slot 123b is arranged substantially opposite to the slot 23b. The support element 147 is mounted in the slots 123a,123b and is arranged for sliding movement along the slots 123a,123b relative to the mounting blocks 21b,121. Thus the support element 147, and hence the fertilizer delivery tube 149, is able to adjust its position along an axis. The third mounting block 121 is bolted to first and second mounting elements 25a,25b. The arrangement is such that the delivery tube 149 is located between the first and second mounting elements 25a,25b.

The mounting blocks 21b,121, support element 147, mounting elements 25a,25b and the support members 19a, 19b are arranged such that the delivery tube 149 is arranged to move along an axis that is in a substantially vertical plane. However, it will be appreciated by the skilled person that mounting arrangement can be such that the delivery tube 149 is oriented inclined to the vertical plane, and can be arranged to move along an axis that is inclined to the vertical plane.

The support element 147 includes limiting protrusions 131a,131b that are arranged to engage with the second and third mounting blocks 21b,121 respectively to limit the axial movement of the support element 147 within the slots 123a,123b, and hence limit the axial movement of the fertilizer delivery tube 149. The first and second protrusions 131a,131b are located towards an upper end of the support element 147, and provide it with a substantially T-shaped configuration. The support element 147 includes a drive formation 133. The drive formation 133 comprises a protrusion in a trailing side 135 of the member, in a mid to lower portion thereof. The drive formation 133 provides an anchor point to enable the hydraulic actuator 151 to be pivotally attached thereto. The hydraulic actuator 151 is arranged to adjust the position of the support element 147, and hence the delivery tube 149, relative to the second and third mounting blocks 21b,121. Typically the support element 147 will be moveable over a distance of around 20 cm from a fully retracted position to a fully deployed position. The movement can be arranged so that the position is continuously adjustable, or alternatively the support element 147 can be arranged to move between predetermined discrete positions, e.g. high, medium and low positions.

The control system 17 is arranged to move the delivery tube 149 independently of the tine 15. Thus each delivery tube 149 and tine 15 is controlled independently of the other.

The hydraulic actuator 151 is controlled by the control system 17. The delivery tube 149 is controlled independently of the tine 15. The control system 17 controls the position of the delivery tube 149 relative to the position of the tine 15 in order to provide the appropriate amount of fertilizer to the ground in the vicinity of the tine 15.

During a tilling operation, it has been found advantageous to control the position of each delivery tube 149 such that each delivery tube 149 retains substantially the same depth position regardless of the tilling depth B of the tine 15. This is illustrated in FIG. 11. Of course it will be appreciated that other control algorithms can be used to adjust each delivery tube 149 depth position according to the tilling depth B of its respective tine 15.

Furthermore, the control system 17 can be arranged to control the position of the delivery tube 149 in accordance with signals received from the positioning system 39. Thus the control system can automatically adjust the position of each delivery tube 149 in accordance with the signals received from the positioning system 49 to select the most appropriate deployment position for that location. The adjustment process takes place dynamically and therefore the position of each delivery tube 149 is adjusted as the tilling apparatus 11 moves through the field. FIGS. 10 and 11 show an arrangement of the strip tilling apparatus 11 having six tilling gangs, and therefore six delivery tubes 149. Each delivery tube 149 is deployed to the appropriate depth for fertilizing the ground in its specific location, according to the local conditions.

The strip tilling system has particular utility for detecting that the tilling apparatus 11 is tilling along at least one tire track 9, i.e. where the ground is highly compacted. From this, the control system 17 is able to deploy the delivery tube 149 to an appropriate depth to more effectively fertilize the soil along the tire track 9.

It will be apparent to the skilled person that modifications can be made to the above embodiment that falls within the scope of the invention. For example each gang 13 can include additional soil conditioning devices to assist the tilling operation such as at least one of a trash remover, a tamping wheel and a fertilizer delivery device. At least one of the additional soil conditioning devices can be arranged substantially in line with the tine. Additionally, or alternatively, at least one of the additional soil conditioning devices can be laterally offset from the tine (when the tilling apparatus is viewed from the front) so that it conditionals the soil substantially parallel to the tine. Typically at least one soil conditioning device is attached to the gang support frame in a position that is forward of the tine (with respect to the normal direction of travel). Optionally at least one of the additional soil conditioning devices can be attached to the gang support frame in a position that is rearward of the tine (with respect to the normal direction of travel).

Although the embodiment described above includes an adjustable tine, it will be appreciated that the adjustable tine can be replaced with a conventional tine. Accordingly, the tilling apparatus, in accordance with some embodiments, can be arranged in the following configurations: 1) adjustable tine and adjustable fertilizer tube; and 2) conventional tine and adjustable fertilizer tube.

In other embodiments, the tilling member, which is shown as a tine can be replaced by a set of tines, a disc or set of discs.

While six gangs are shown in the Figures, any practicable number of gangs can be used. Typical tilling apparatus includes n gangs, where n is a number in the range 1 to 24, and preferably in the range 4 to 16.

In the embodiment above, the vertical position of each tine is maintained by operation of its respective hydraulic actuator. In some embodiments it may be desirable to include a mechanism for temporarily fixing the deployment position of the tine, so that the actuator is not continuously loaded during a tilling operation. For example, the mechanism can comprise a clamping mechanism, which fixes the position of the tine with respect to the mounting blocks when the desired deployment position has been reached. The clamping mechanism can be controlled by the control system. The control system can be arranged to open the clamping mechanism prior to adjusting the position of the tine, and to close the clamping mechanism again when the desired position has been reached. A similar mechanism can be applied to the fertilizer delivery tube where necessary.

In the embodiment above, the actuators used are hydraulic actuators. Others types of actuators can be used, for example electro-mechanical devices.

At least one of the control system and the positioning system can include data relating to the geometry of the strip tilling apparatus.

The invention claimed is:

1. A strip tilling system comprising:
   a control system;
   at least one strip tilling unit, said strip tilling unit including a support frame, at least one tilling member mounted to the support frame, and at least one fertilizer delivery device mounted to the support frame;
a positioning system; and
a memory including map data relating to a field to be tilled, said map data including data identifying areas of compacted ground in the field;
wherein the control system is arranged to automatically adjust the position of the at least one fertilizer delivery device with respect to the support frame in response to the control system determining, from signals received from the positioning system and from the map data, that the tilling member is located at an area of compacted ground.

2. A strip tilling system according to claim 1, wherein the control system is arranged to adjust the position of the fertilizer delivery device independently of the tilling member.

3. A strip tilling system according to claim 1, wherein the fertilizer delivery device is constrained to move along one axis.

4. A strip tilling system according to claim 1, wherein the position of the fertilizer delivery device with respect to the support frame is adjustable in a substantially vertical plane.

5. A strip tilling system according to claim 1, wherein the position of the fertilizer delivery device with respect to the support frame is adjustable in a plane that is inclined to a vertical plane.

6. A strip tilling system according to claim 1, wherein the fertilizer delivery device is slidably mounted.

7. A strip tilling system according to claim 1, wherein the fertilizer delivery device is mounted to at least one mounting member and is arranged to move relative to the mounting member.

8. A strip tilling system according to claim 7, wherein the mounting member is attached to the support frame.

9. A strip tilling system according to claim 8, wherein the mounting member is pivotably attached to the support frame.

10. A strip tilling system according to claim 9, further comprising damping means for damping pivoting movement of the mounting member with respect to the support frame.

11. A strip tilling system according to claim 7, wherein the fertilizer delivery device is attached to a support element that is slidably mounted to the mounting member.

12. A strip tilling system according to claim 11, further comprising limiting means for limiting axial movement of the fertilizer delivery device.

13. A strip tilling system according to claim 1, wherein the control system further comprises a first actuator arranged to adjust the position of the fertilizer delivery device.

14. A strip tilling system according to claim 1, wherein the control system is arranged to adjust the position of the tilling member with respect to the support frame.

15. A strip tilling system according to claim 1, wherein said control system is further arranged to automatically adjust the position of the at least one tilling member with respect to the support frame in response to the control system determining, from signals received from the positioning system and from the map data, that the tilling member is located at an area of compacted ground.

16. A strip tilling system according to claim 1, wherein at least some of the areas of compacted soil in the map data relate to positions of vehicle tire tracks, and the control system is arranged to adjust the position of the tilling member to increase the tilling depth when it determines that the tine is tilling on a tire.

17. A strip tilling system according to claim 1, wherein the positioning system further comprises tracking means for recording locations of new vehicle tire tracks formed in the ground.

18. A strip tilling system according to claim 17, further comprising means for storing the locations of the new vehicle tire tracks.

19. A strip tilling system according to claim 1, wherein the map data includes data relating to at least one of the following: underground obstacles; ground level obstacles; localised depressions; localised raised areas; former work programs used on the field such as ploughing, conservation tillage areas, no-tillage areas; soil compaction by animals; soil compaction by other means; and soil type.

20. A strip tilling system according to claim 1, wherein the tilling member is constrained to move along one axis.

21. A strip tilling system according to claim 14, wherein the position of the tilling member with respect to the support frame is adjustable in a substantially vertical plane.

22. A strip tilling system according to claim 14, wherein the position of the tilling member with respect to the support frame is adjustable in plane that is inclined to a vertical plane.

23. A strip tilling system according to claim 1, wherein the tilling member is slidably mounted.

24. A strip tilling system according to claim 7, wherein the tilling member is mounted to the mounting member and is arranged to move relative to the mounting member.

25. A strip tilling system according to claim 24, wherein the tilling member is slidably mounted to the mounting member.

26. A strip tilling system according to claim 24, further comprising limiting means for limiting movement of the tilling member.

27. A strip tilling system according to claim 14, wherein the control system includes a second actuator arranged to adjust the position of the tilling member.

28. A strip tilling system according to claim 1, wherein the support frame further comprises first and second support members and at least one of the tilling member and the fertilizer delivery device is located between the first and second support members.

29. A strip tilling system according to claim 28, wherein the first and second support members are arranged substantially parallel with one another.

30. A strip tilling system according to claim 28, wherein the fertilizer delivery device is mounted to at least one mounting member and is arranged to move relative to the mounting member, and wherein the mounting member is located between the first and second support members.

31. A strip tilling system according to claim 1, including a plurality of fertilizer delivery devices.

32. A strip tilling system according to claim 1, further comprising a plurality of tilling members.

33. A strip tilling system according to claim 1, further comprising a plurality of strip tilling units, wherein each strip tilling unit comprises a support frame, a tilling member mounted to the support frame, and a fertilizer delivery device mounted to the support frame.

34. A strip tilling system according to claim 31, wherein the control system is arranged to control the position of at least one of the fertilizer delivery devices independently of the other fertilizer delivery devices.

35. A strip tilling system according to claim 31, wherein the control system is arranged to deploy each of the fertilizer delivery devices to substantially equivalent deployment positions.

36. A strip tilling system according to claim 32, wherein the control system is arranged to adjust the position of at least one of the tilling members independently of the other tilling members.

37. A strip tilling system according to claim 1, wherein the number of fertilizer delivery devices equals the number of tilling members.

38. A strip tilling system according to claim 1, further comprising means for locking the position of the tilling member.

39. A strip tilling system according to claim 1, further comprising means for locking the position of the fertilizer delivery device.

40. A method for strip tilling comprising:
providing:
- a control system;
- at least one strip tilling unit, said strip tilling unit including a support frame, at least one tilling member mounted to the support frame, and at least one fertilizer delivery device mounted to the support frame;
- a positioning system; and
- a memory, the memory including map data relating to a field to be tilled, said map data including data identifying areas of compacted ground in the field;

determining, with the control system, from signals received from the positioning system and from the map data, that the tilling member is located at an area of compacted ground, and in response:

automatically adjusting, with the control system, the position of the at least one fertilizer delivery device with respect to the support frame during a strip tilling operation.

41. A method according to claim 40, further comprising adjusting, with the control system, the position of the fertilizer delivery device independent of the at least one tilling member.

42. A method according to claim 40, further comprising automatically adjusting, with the control system, the position of the at least one tilling member with respect to the support frame in response to the control system determining, from signals received from the positioning system and from the map data, that the tilling member is located at an area of compacted ground.

* * * * *